Sept. 6, 1966  R. N. NEALIS  3,270,408
SEPARABLE INTERLOCKING FASTENERS AND METHOD OF MAKING THEM
Original Filed Oct. 21, 1959
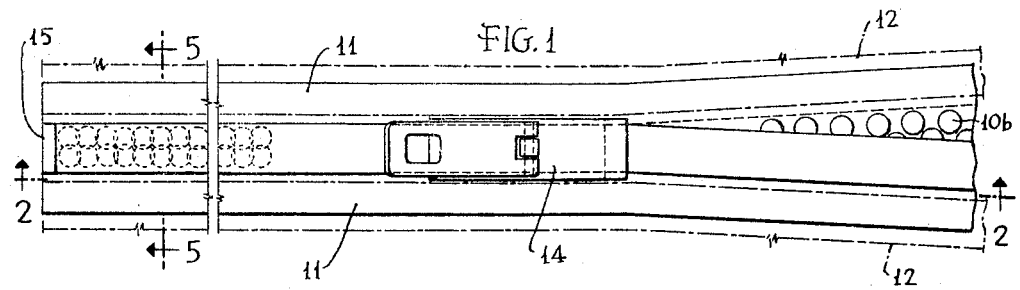
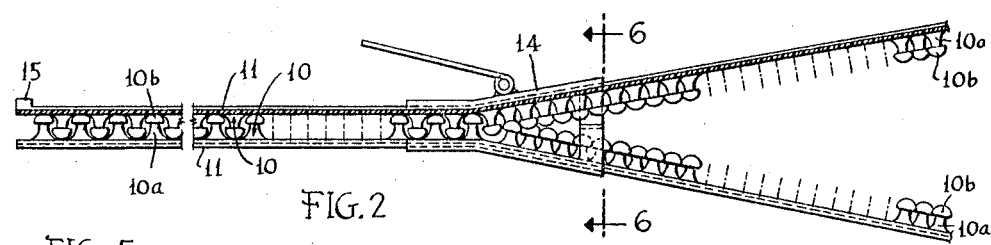
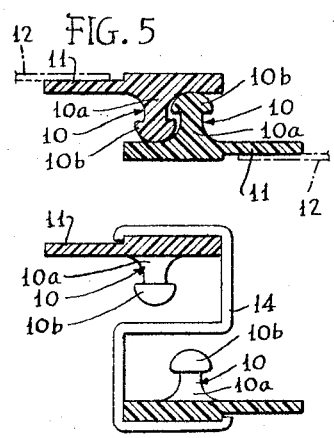
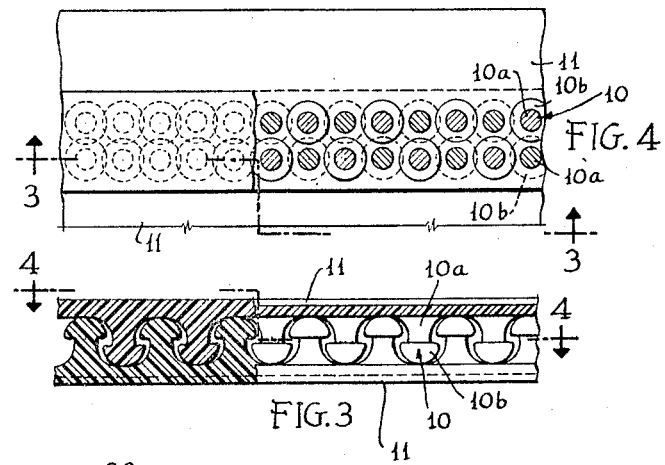
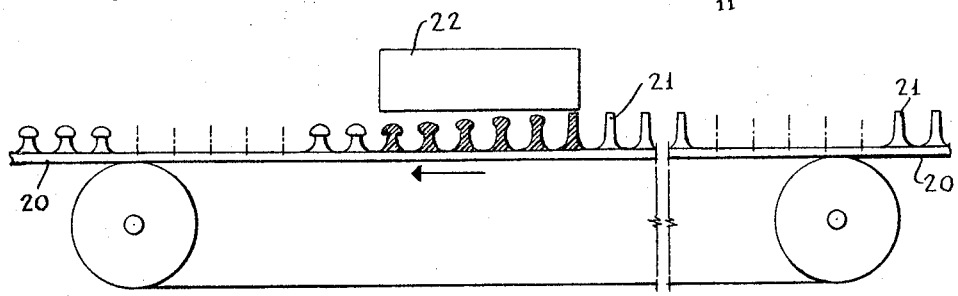
INVENTOR.
Raymond N. Nealis

United States Patent Office 3,270,408
Patented Sept. 6, 1966

3,270,408
SEPARABLE INTERLOCKING FASTENERS AND
METHOD OF MAKING THEM
Raymond N. Nealis, 11 Harvest Road, Levittown, Pa.
Application Aug. 13, 1962, Ser. No. 216,613, now Patent No. 3,191,255, dated June 29, 1965, which is a continuation of application Ser. No. 847,841, filed Oct. 21, 1959. Divided and this application May 4, 1965, Ser. No. 453,151
4 Claims. (Cl. 29—408)

This application is a division of my copending application Serial No. 216,613, filed August 13, 1962, now Patent 3,191,255. Application Serial No. 216,613 is a continuation of Serial No. 847,841, filed October 21, 1959, now abandoned.

This invention relates in general to separable interlocking fasteners and more particularly to a method of making them and has for an object the provision of improvements in this art.

One of the particular objects of the invention is to provide a method of making fasteners of simple form which can be easily and inexpensively produced.

Another object is to provide a method of making fastener elements which are arranged in staggered relation in adjacent rows so that each element (except at ends) is engaged with three adjacent elements whereby both lateral and axial displacement are strongly resisted.

Another object is to provide a method of making fastener elements which are elastic in their heads, and flexible in their shanks and in their supports so that they may be readily engaged, by hand or by slider, and if by hand, starting at any point along the length of a strip, and which will strongly resist separation after being secured together.

Another object is to provide a method of making fastener interlocked rows of elements with their shanks normal to the planes of pull tending to separate the elements so that the staggered elements of adjacent rows fully and completely resist separation laterally in the planes of pulling forces, the elements being engaged and disengaged by movement normal to the planes of the pulling forces.

Another object is to provide a simple and inexpensive method of forming the fasteners.

The above and other objects and advantages of the invention will be understood from the following description of certain exemplary embodiments of the invention, reference being made to the accompanying drawings, wherein:

FIG. 1 is a top plan view of mating strips of fasteners embodying the invention, the strips here being engaged by a slider;

FIG. 2 is a side view and section taken on the line 2—2 of FIG. 1;

FIG. 3 is an enlarged view of a portion of FIG. 2, showing the elements engaged, the section being shown on the line 3—3 of FIG. 4;

FIG. 4 is a section taken on the line 4—4 of FIG. 3;

FIG. 5 is an enlarged transverse section taken on the line 5—5 of FIG. 1;

FIG. 6 is a transverse section taken on the line 6—6 of FIG. 2; and

FIG. 7 is a section showing how the heads of the elements are formed.

The fastener comprises superimposed interengaging elements 10 which are secured to and extend upward generally normal or perpendicular, from the plane of a flexible longitudinal base sheet or support strip 11 which is secured to the edges 12 of the article on which the fastener is used. As will be understood by those skilled in the art, the strip 11 and its elements 10 are made by conventional molding or casting techniques.

Each element includes a stem $10a$ and a head $10b$. The stem may be formed integrally with the support strip, especially when plastic material is used, as is preferable. Nylon, pyroxylin, polyethylene, rubber and other plastics are suitable. It will be understood by those skilled in the art that such materials will be flowable when heat is applied. The stem is flexible and the head preferably is also as well as being elastic so as to be deformable during interengagement. The flexible support strip, preferably also is somewhat elastic so as to yield in any direction to aid in the interengagement of the elements. With such a flexible support it is feasible to use more rigid and non-elastic elements.

The heads of the elements are tapered on the outer end, shown as conical or convex, so as to wedge past each other and are shouldered on their under sides so as to retain their connection and resist separation. The interengaging conical and shouldered surfaces are circumferentially continuous around the shank so as to be interengageable on all sides.

The elements are arranged in two parallel rows on each support strip with the elements of the two rows staggered relative to each other. The spacing of the elements in each row is such that the stem or shank of a mating element will closely fit between the heads of adjacent elements and the head of the mating element will closely fit between the stems of two adjacent elements. The adjacent rows are so spaced that the same relationship prevails, that is, the head of a mating element engages the stem of an element of the adjacent row and vice versa.

The head of each element (except, of course, the end element) thus engages under the head of three adjacent opposite elements and is strongly retained against axial (axial of the element stem) separation by the interengaging shoulders of the heads. Since the lateral forces are balanced by the three-point engagement there is no tendency for an element to move sidewise and work out in spite of the fact that the stems may be flexible.

On the other hand, the tapered heads can wedge into interengaging position by pushing adjacent opposed elements out of the way both longitudinally and transversely of the rows since the element stems and the support strips are flexible and the heads (in the preferred form) are elastic.

As shown herein, the support strips are arranged in or parallel to the plane of the edges of the article; that is, the lines of force tending to separate the elements lie in the planes of the support strips and normal to the axes of the stems of the elements. In this arrangement the opposed elements of adjacent rows directly block each other and the possibility of separation in the plane of the pull is practically negligible.

An important feature of the fastener is that operation by hand is very easy and interengagement may be started at any point along the length as well as at the ends. Bending of the support strips out of their normal planes and the cumulative yielding of the elements provides for this; yet when the support strips are in their active position and there is no local out-of-plane pull the retentive grip of the fastener is extremely strong.

For convenience a slider may be used. One is indicated at 14. The slider interiorly is generally Z-shaped to extend around the overlapping support strips.

Practically all of the known accessory arrangements of usual slide fasteners can readily be applied to the present fastener in fairly obvious ways. For example, one end can be permanently secured together by rivets or staples or can be adhesively joined where, for example, the end stop elements 15 can be enlarged and fused together by heat. Completely separable elements could be used if a permanent connection is not wanted here. Toward the other end the slider tab may lock when pushed down in known manner; or the ends may carry snap fasteners, hooks or the like to lock against separation when a slider is not used; or additionally, even when it is used.

The arrangement of elements longitudinally and transversely is symmetrical and strips of elements can be interengaged in parallel or transverse orientation, but more importantly, the material may be made in sheets having many coordinate rows of elements and strips of elements cut off in either direction.

FIG. 7 illustrates a method of forming strips or sheets of elements. Here a sheet 20 of plastic material with integral projections 21 is subjected to heat at the ends of the elements and this causes the material at the ends of the projections to flow down and unite with the lower material to form the heads. It has been found that certain plastics react to this treatment to form heads of almost perfect desired shape having convex ends and nether shoulders. As clearly indicated in FIGURE 4, the cross section of each head of an element is greater than the cross section of the stem of the element, the respective cross sections being taken in a plane parallel to the plane of the strip.

It would be almost impossible to form the integral headed projections and backing strip by any known molding process because such a structure after formation could not be freed from the mold.

The heated iron 22 travels progressively along the sheet or the sheet is passed along beneath a heated iron. The size and shape of the heads can be varied by varying the heat of the iron, its length, its speed of travel, and the distance above the projections.

It is thus seen that the invention provides an improved interlocking-element fastener and an improved method of making it.

While one embodiment of the invention has been disclosed for purposes of illustration it is to be understood that there may be various embodiments and modifications within the general scope of the invention.

I claim:

1. The method of forming fastener units which comprises: providing a base sheet of flexible plastic material with upstanding integral, flexible elements and heating each element progressively in a direction from its end toward the base sheet to an extent to cause the material of the element to flow transversely and toward the base sheet so that the element is progressively shortened in length and the flowing of the material forming a mass of larger cross section than the cross section of the element and then cooling the mass, the mass forming a head on the element.

2. The method of forming fastener units which comprises: providing a base sheet of flexible plastic material with upstanding integral, flexible elements and applying heat at the end of each element to cause the material at the end of the element to flow towards the base sheet and unite with the lower material of the element to form a head with a nether shoulder and of larger cross section than the cross section of the elements.

3. The method of forming a fastener which comprises units to be superimposed one upon the other, the method comprising the steps of:
   making one fastener unit by providing a base sheet of flexible plastic material with a plurality of adjacent rows of upstanding integral, flexible elements staggered in position and spaced apart from one another;
   applying heat at the end of each element to cause the material at the end of the element to flow transversely and toward the base sheet so that the element is progressively shortened in length and the flowing of the material forming a mass of larger cross section than the cross section of the stem of the element;
   cooling the mass, the mass forming a head on the element;
   making the other fastener unit by providing a second base sheet of flexible plastic material with a plurality of adjacent rows of upstanding integral, flexible elements staggered in position and spaced apart from one another;
   applying heat at the end of each element of the second strip to cause the material at the end of the element to flow transversely and toward the base sheet so that the element is progressively shortened in length and the flowing of the material forming a mass of larger cross section than the cross section of the stem of the element; and
   cooling last said mass, the mass forming a head on the element, said staggered position and spacing providing, when the units are placed one upon the other, for the head of each element on one unit, except the end elements, to be located below the heads of and between the stems of three opposed elements on the other unit, said below and between location of the heads providing for inter-engagement of the heads and stems and the engagement preventing a separation of the units by lateral forces but permitting separation by forces tending to lift one unit away from the other.

4. The method of forming a fastener which comprises units superimposed on one another, the method comprising the steps of:
   making one fastener unit by providing a base sheet of flexible plastic material with a plurality of adjacent rows of upstanding integral, flexible elements staggered in position and spaced apart from one another;
   applying heat at the end of each element to cause the material at the end of the element to flow transversely and toward the base sheet so that the element is progressively shortened in length and the flowing of the material forming a mass of larger cross section than the cross section of the stem of the element;
   cooling the mass, the mass forming a head on the element;
   making the other fastener unit by providing a second base sheet of flexible plastic material with a plurality of adjacent rows of upstanding integral, flexible elements staggered in position and spaced apart from one another;
   applying heat at the end of each element of the second strip to cause the material at the end of the element to flow transversely and toward the base sheet so that the element is progressively shortened in length and the flowing of the material forming a mass of larger cross section than the cross section of the stem of the element;
   cooling last said mass, the mass forming a head on the element; and
   placing the units one upon the other with the head of each element on one unit, except the end elements, located below the heads of and between the stems of three opposed elements on the other unit, said below and between location of the heads providing for inter-engagement of the heads and the stems and the engagement preventing a separation of the units by lateral forces but permitting separation by forces tending to lift one unit away from the other.

References Cited by the Examiner

UNITED STATES PATENTS

| | | | | |
|---|---|---|---|---|
| 2,234,994 | 3/1941 | Vernon et al. | | |
| 2,422,325 | 6/1947 | Wheelon | 264—320 X | |
| 2,848,749 | 8/1958 | Tobias | 264—80 | |
| 2,942,300 | 6/1960 | Masters. | | |
| 2,979,776 | 4/1961 | Morin. | | |
| 3,000,057 | 9/1961 | Swedlow et al. | 264—324 X | |
| 3,069,723 | 12/1962 | Porepp | 264—280 | |
| 3,092,439 | 6/1963 | Harrison | 264—230 X | |
| 3,093,526 | 6/1963 | Price et al. | 264—230 X | |
| 3,139,468 | 6/1964 | Wheat | 264—320 X | |

ROBERT F. WHITE, *Primary Examiner.*

M. R. DOWLING, *Assistant Examiner.*